United States Patent [19]
Wolf

[11] Patent Number: 5,188,300
[45] Date of Patent: Feb. 23, 1993

[54] METHOD FOR DISPOSING OF FILTER CARTRIDGES

[76] Inventor: Joachim Wolf, Malmsheimer Strasse 67, 7252 Weil der Stadt, Fed. Rep. of Germany

[21] Appl. No.: 712,155

[22] Filed: Jun. 7, 1991

[51] Int. Cl.⁵ .............................................. B02C 23/00
[52] U.S. Cl. ................................. 241/23; 241/DIG. 14
[58] Field of Search ........................ 241/15, 16, 17, 18, 241/19, 20, 23, DIG. 14, 199.12

[56] References Cited

U.S. PATENT DOCUMENTS

| | | | |
|---|---|---|---|
| 3,617,003 | 11/1971 | Winegartner | 241/16 |
| 3,788,562 | 1/1974 | Greenlay et al. | 241/19 X |
| 3,814,331 | 6/1974 | Ronning | 241/19 |
| 4,177,241 | 12/1979 | Divins et al. | 241/24 X |

FOREIGN PATENT DOCUMENTS

| | | | |
|---|---|---|---|
| 187260 | 10/1956 | Austria | 241/199.12 |
| 170473 | 2/1960 | Sweden | 241/199.12 |
| 250320 | 6/1948 | Switzerland | 241/199.12 |

*Primary Examiner*—Mark Rosenbaum
*Assistant Examiner*—Frances Chin

[57] ABSTRACT

Filter inserts that contain solvent residues from varnishes, paint, adhesive, coating masses and the like are disposed of by putting the filter inserts into a sealable vessel, such as a homogenization machine used in the milk industry. The filter inserts are ground and heated in the sealed vessel together with solvent residues. The heat converts the solvent residues to a gas phase. A negative pressure pump downstream from a solvent condenser drains the gaseous solvent from the vessel into the solvent condenser. Solvent condensate is precipitated in the solvent condenser and fed to a condensate collecting tank.

9 Claims, 1 Drawing Sheet

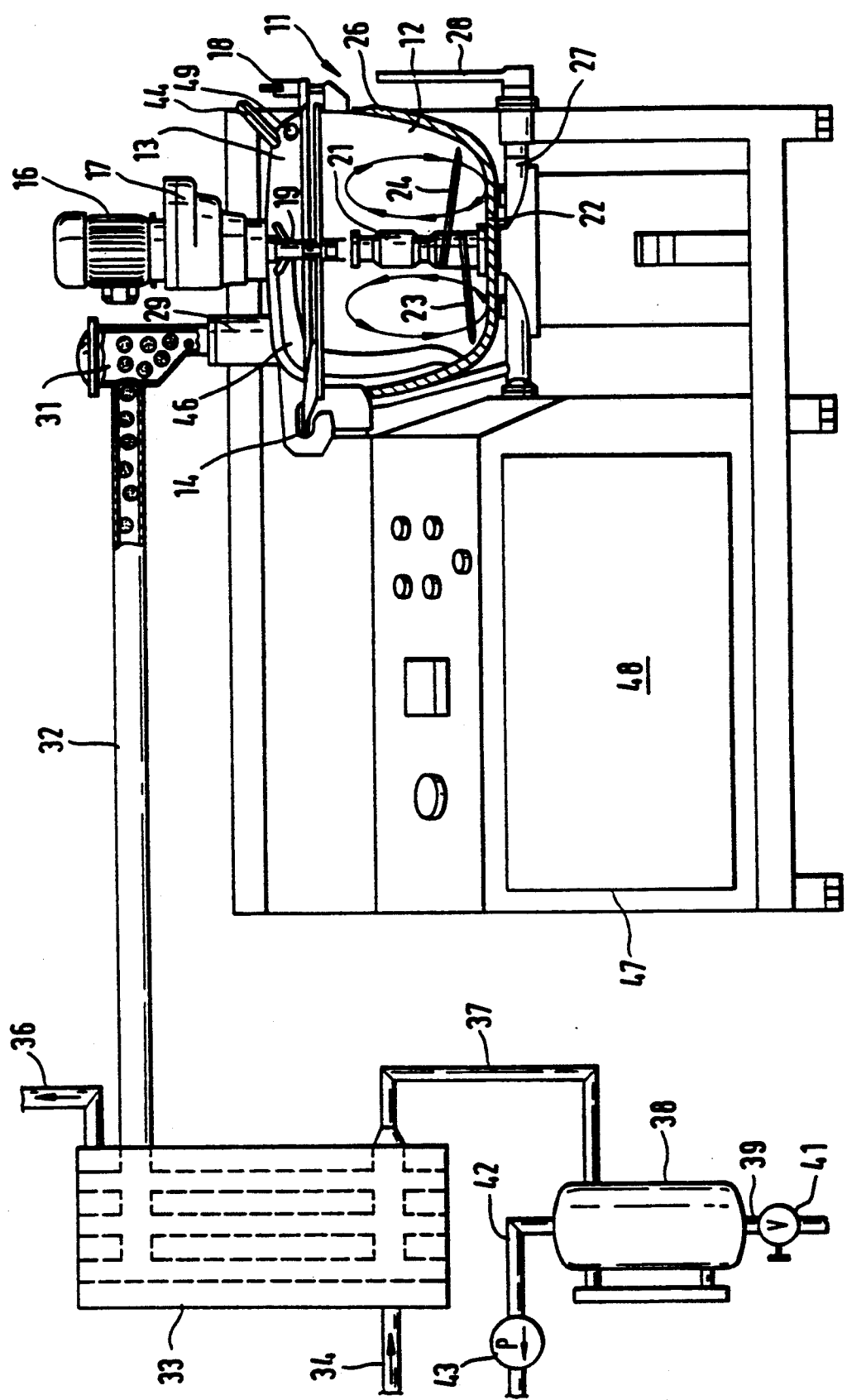

METHOD FOR DISPOSING OF FILTER CARTRIDGES

The invention relates to a method for disposing of filter inserts that contain solvent residues and an apparatus therefor.

BACKGROUND OF THE INVENTION

Solvents are used in the production of varnishes, paints, adhesives, coating masses, such as, for example, in the production of magnetic tapes, etc. The media are filtered in filter cartridges. At the end of the service life of the filter cartridges, the filter cartridges themselves and the liquid medium on the contaminated side of the filter cartridges become waste.

Disposal is a very large problem. Disposal is also very expensive. The filter cartridges, together with the medium, must almost always be taken to special waste incineration plants. This entails great costs. The solvents are incinerated instead of being recovered.

Dehydrating the medium located in the filter elements takes a very long time.

OBJECT AND STATEMENT OF THE INVENTION

The object of the invention is to provide an environmentally friendly and economic disposal of filter cartridges, in which disposal process the solvents can also be recovered at the same time. Furthermore, the volume of waste is to be considerably reduced so that, under favorable conditions, even the solid waste can be disposed as normal waste and does not need to be disposed as special waste. However, the latter currently presupposes that pigments or other similar solid ingredients of the media to be filtered do not have any constituents which have to be declared as special waste, such as for example, heavy metals.

Additionally, however, the invention is also intended to provide at least the beginnings of a possibility of a better method of getting at the heavy metals.

Tests have shown that standard available communication plants, which are based on the principle of crushing/tearing, cannot solve the problem.

In respect of the method, the invention is achieved by the following features:

a) grinding filter inserts, together with solvent residues in a sealable vessel;

b) heating said filter inserts together with said solvent residues;

c) drawing gaseous solvent from said sealable vessel into a solvent condenser by a negative pressure pump connected to said solvent condenser; and d) feeding condensate that has precipitated in said solvent condenser to a condensate collecting tank.

In respect of the apparatus, the invention is achieved by the following features:

a grinding unit including a sealable vessel, means for heating said filter inserts containing solvent residues in said sealable vessel, a negative pressure-resistent pipe connected to said sealable vessel, a negative pressure-resistant solvent condenser connected to said sealable vessel via said negative pressure-resistant pipe, and a negative pressure generator connected to said solvent condenser.

One idea contributing to the invention resulted from a universal machine of the type UMM/SK which, according to a manufacturer's brochure, is ideal for the milk industry and related operations and has been used hitherto in the temperature range from 110° C. to 130° C. for sterilizing scalded and processed cheese, in the temperature range from 90° C. to 100° C. for pasteurizing hard cheese and in the temperature range from 10° C. to 80° C. for heating cream and double cream curd preparations, for clotted cream and for curd preparations with fruit and herbs.

The described embodiment includes the following additional advantageous features:

The sealable vessel is homogenization machine used in the milk industry, in particular a UMM/SK machine of Messrs. Stephan from 3250 Hameln, Germany.

The solvent residues are converted to a gas phase by heat generated by stray grinding power and additional heat.

This method is continued until the filter inserts are ground within a range between powder and granules.

The method is continued until the ground filter inserts are neutral in terms of odour.

The method is continued until the filter inserts are ground to a pouring and shaking thickness in accordance with DN 53912, or to a pourability in accordance with German Standard DIN 53916.

The apparatus includes a condensate collecting tank connected to the solvent condenser.

The solvent condenser is a cooling water condenser.

A heat input apparatus is connected to supply heat to the grinding unit, the heat input apparatus having a capacity sufficient for gasifying solvents.

A speed regulating apparatus is provided for the grinding unit; a temperature sensor is provided for sensing temperature in the sealable vessel; and means are connected to the speed regulating apparatus for reducing the speed of the grinding unit when a predetermined temperature is reached.

The speed regulating apparatus reduces speed to between about 1000 and 4000 r.p.m., more particularly to the region of 3000 r.p.m.

The speed reducing means is adopted to reduce the speed with a variable speed means.

The speed reducing means is adapted to reduce the speed in at least one stage.

Means drive the grinding unit in opposite directions of rotation.

A wall scraper is in the sealable vessel, and means are provided for driving the wall scraper in at least one direction.

The grinding unit rotates in one direction, and the driving means is adapted to drive the wall scrapper at least counter to the direction of rotation of the grinding unit.

The driving means is adapted to rotate the wall scraper substantially slower than the grinding unit.

The grinding unit has blades that are sharpened, and are located at different heights.

A solids separator is connected downstream of the sealable vessel, and upstream of the negative pressure-resistant pipe.

The solids separator includes a fluff separator.

The grinding unit is adapted initially to reduce the filter inserts to the size of a fist at a low speed of rotation and then at least to the size of granules at a higher speed.

The speed of the grinding unit is reduced at a predetermined temperature of between 50° C.-100° C., depending on the boiling point of said solvent residues.

More heat is provided for soft plastics than for hard plastics.

The heating means provides heat from outside the sealable vessel from the start of operation of the apparatus.

Means are provided for conducting an inert gas into the sealable vessel at the start of operation of the apparatus, or at the end of operation, or during operation.

The invention is now described with reference to a preferred embodiment.

DESCRIPTION OF THE DRAWING

The drawing shows diagrammatically the construction of the invention.

DETAILED DESCRIPTION

A container 11 comprises a vat 12, on which a lid 13 fits in a gas-tight manner, which lid is connected to the vat 12 via a hinge 14. An electric motor 16, together with its downstream reducing gear 17, is attached to the lid 13. The reducing gear 17 reduces the speed in one or more definite stages. In another known variation, the reducing gear 17 reduces the speed over a relatively wide range with indefinite variability. The lid 13 can be pulled towards the vat 12 using a toggle 18. The vat 12 has a capacity of about 300 liters. Projecting into the lid is a shaft 19 which is connected positively to a blade shaft 21 when the lid 13 is closed. The blade shaft 21 is fixedly attached, standing upright, to the base 22 of the vat 12. It can be driven by the electric motor 16 and bears blades 23, 24 at different height levels in its lower region. Heat can be fed in through a shell 26 in a controlled manner. The shell 26 surrounds the base 22 and, in terms of height, more than half of the vat 12.

Together with the shell 26, the vat is attached in a tilting manner to a horizontal shaft 27 which has a swivel lever 28 on the outside, so that the vat 12 can also be swivelled into the horizontal plane when the lid is opened for emptying.

Attached to the lid 13 at the top is an upwardly projecting nozzle 29 which merges at the top into a solids separator 31. From the latter, in turn, a negative pressure-resistant pipe 32 passes to a negative pressure resistant condenser 33 which is of double-walled construction and into one hollow space of which cooling water can flow in through a nozzle 34 and then warmer cooling water can flow out through a nozzle 36. Passing into the other hollow space of the condenser 33 is a gaseous solvent which may also be a solvent mixture. It precipitates in the condenser 33 and passes via a pipe 37 into a collecting tank 38 for the condensate. Said collecting tank has at the bottom an outlet 39 which can be opened, if required, by a magnetic valve 41. At the top of the collecting tank 38 there is a likewise negative pressure-resistant pipe 42 which leads to a negative pressure pump (negative pressure generator) 43.

A heat sensor 44 projects into the vat 12. Provided additionally in the vat 12 is a crescent-shaped wall scraper 46 which receives its speed, substantially reduced, from the reducing gear 17.

A control and regulating apparatus 48 is provided in a cabinet 47 which accommodates the vat 12 and the lid 13 on the right.

During operation of the apparatus, the used filter cartridges are thrown into the vat 12, the lid is closed by means of the toggle 18, heat is fed in through the shell 26 and the negative pressure pump 43 is switched on. The cooling water is also allowed to circulate through the nozzles 34, 36. The control and regulating apparatus 48 initially controls the electric motor 16 at a low speed until the filter cartridges have been reduced to the size of a fist. During this process, gas is already extracted via the pipe 32 and solvent is precipitated in the condenser 33. Depending on the contribution of heat from the cutting work of the blades 23, 24, the control and regulating apparatus 48 decreases the heat input through the shell 26. Then the speed on the blade shaft 21 is increased quite substantially and it continues turning until the contents of the container 11 have been reduced sufficiently. This can be, for example, a size of 0 to 3 mm and the operation takes approximately 10 to 30 minutes. The solids separator 31 primarily prevents fluff from passing into the condenser 33 since many filter cartridges do have at least a certain proportion of textile material. However, the solids separator 31 also prevents solid small particles, such as dust, granules or the like, from passing into the pipe 32. An inlet 49 in the lid 13 serves to introduce inert gas, such as, for example, nitrogen, for preventing the risk of explosion.

I claim:

1. Method for disposing of filter inserts that contain solvent residues comprising
   a) grinding filter inserts, together with solvent residues in a sealable vessel;
   b) heating said filter inserts together with said solvent residues;
   c) drawing gaseous solvent from said sealable vessel into a solvent condenser by a negative pressure pump connected to said solvent condenser; and
   d) feeding condensate that has precipitated in said solvent condenser to a condensate collecting tank.

2. Method according to claim 1, wherein performing said grinding step in a sealable vessel that is a homogenization machine used in the milk industry.

3. Method according to claim 2, where performing said grinding step in a sealable vessel that is an SK machine.

4. Method according to claim 3, wherein performing said grinding step in a sealable vessel that is an UMM/SK machine.

5. Method according to claim 1, wherein said heating step converts said solvent residues to a gas phase by heat generated by stray grinding power and additional heat.

6. Method according to claim 1, wherein said grinding step yields filter inserts ground within a range between powder and granules.

7. Method according to claim 6, wherein said grinding, heating and drawing steps yield filter inserts that are neutral in terms of odour.

8. Method according to claim 6, wherein said grinding step yields filter inserts ground to a pouring and shaking thickness in accordance with DIN 53912.

9. Method according to claim 6, wherein said grinding step yields filter inserts having a pourability in accordance with German Standard DIN 53916.

* * * * *